(12) United States Patent
Menjo

(10) Patent No.: US 11,993,333 B2
(45) Date of Patent: May 28, 2024

(54) VEHICLE LAMP

(71) Applicant: KOITO MANUFACTURING CO., LTD., Tokyo (JP)

(72) Inventor: Yosuke Menjo, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/784,945

(22) PCT Filed: Nov. 18, 2020

(86) PCT No.: PCT/JP2020/043069
§ 371 (c)(1),
(2) Date: Jun. 13, 2022

(87) PCT Pub. No.: WO2021/124779
PCT Pub. Date: Jun. 24, 2021

(65) Prior Publication Data
US 2023/0011436 A1    Jan. 12, 2023

(30) Foreign Application Priority Data

Dec. 16, 2019  (JP) ................. 2019-226553
Dec. 16, 2019  (JP) ................. 2019-226554

(51) Int. Cl.
*B62J 6/023*      (2020.01)
*B62J 45/415*     (2020.01)
*F21V 14/04*      (2006.01)

(52) U.S. Cl.
CPC .......... *B62J 6/023* (2020.02); *B62J 45/4151* (2020.02); *F21V 14/04* (2013.01)

(58) Field of Classification Search
CPC ........ B62J 6/023; B62J 45/4151; F21V 14/04
See application file for complete search history.

(56) References Cited

U.S. PATENT DOCUMENTS

2001/0040810 A1* 11/2001 Kusagaya ............... B60Q 1/085
362/465
2009/0043458 A1*  2/2009 Kamioka ............... B60Q 1/085
701/49

(Continued)

FOREIGN PATENT DOCUMENTS

| DE | 102012200048 A1 | 7/2013 |
| DE | 102018214843 A1 | 2/2019 |
| EP | 3401838 A1 | 11/2018 |
| EP | 3517362 A1 | 7/2019 |
| JP | 2014-4922 A | 1/2014 |

(Continued)

OTHER PUBLICATIONS

Communication dated Jan. 25, 2023 issued by the European Patent Office in application No. 20902355.5.

(Continued)

*Primary Examiner* — Christopher E Dunay
(74) *Attorney, Agent, or Firm* — Sughrue Mion, PLLC

(57) ABSTRACT

A vehicle lamp includes: a light source; an optical member configured to form a predetermined light distribution pattern by radiating light; and a controller configured to adjust the predetermined light distribution pattern so as to include a first non-irradiation range in which an object outside a vehicle is not irradiated with the light when the object is detected. The controller is configured to define the first non-irradiation range based on a case where a vehicle body is in a straight traveling state. When the vehicle body is in a cornering state, the controller is configured to acquire height information of the object in accordance with a tilting state of the vehicle body, define a second non-irradiation range narrower than the first non-irradiation range based on the height information, and adjust the predetermined light distribution pattern so as to include the second non-irradiation range instead of the first non-irradiation range.

7 Claims, 12 Drawing Sheets

(56) References Cited

U.S. PATENT DOCUMENTS

| | | | | |
|---|---|---|---|---|
| 2009/0315479 A1* | 12/2009 | Hayakawa | ............ | F21S 41/698 |
| | | | | 315/294 |
| 2010/0213872 A1* | 8/2010 | Heider | .................... | B60Q 1/12 |
| | | | | 315/297 |
| 2011/0012510 A1* | 1/2011 | Tani | .................... | B60Q 1/1423 |
| | | | | 315/82 |
| 2013/0131922 A1* | 5/2013 | Ogata | .................... | G06V 20/56 |
| | | | | 701/117 |
| 2013/0258689 A1* | 10/2013 | Takahira | ............... | F21S 41/151 |
| | | | | 362/465 |
| 2014/0268837 A1 | 9/2014 | Simchak et al. | | |
| 2015/0149045 A1 | 5/2015 | Mizuno et al. | | |
| 2015/0151669 A1 | 6/2015 | Meisner et al. | | |
| 2021/0114678 A1 | 4/2021 | Harada | | |

FOREIGN PATENT DOCUMENTS

| | | |
|---|---|---|
| JP | 2017171052 A | 9/2017 |
| WO | 2014184634 A2 | 11/2014 |
| WO | 2019/039051 A1 | 2/2019 |

OTHER PUBLICATIONS

International Search Report (PCT/ISA/210) issued Jan. 12, 2021 by the International Searching Authority in counterpart International Application No. PCT/JP2020/043069.
Written Opinion (PCT/ISA/237) issued Jan. 12, 2021 by the International Searching Authority in counterpart International Application No. PCT/JP2020/043069.

* cited by examiner

VEHICLE LAMP

TECHNICAL FIELD

The present invention relates to a vehicle lamp.

BACKGROUND ART

As a head lamp for a two-wheeled vehicle, there is a high beam and low beam light source (Patent Literature 1).

CITATION LIST

Patent Literature

Patent Literature 1: WO2019/039051

SUMMARY OF INVENTION

Technical Problem

In a four-wheeled vehicle, a system has been proposed in which a light distribution pattern radiated from a head lamp includes a plurality of regions arranged in parallel in a horizontal direction, and a part of the plurality of regions is not irradiated with light corresponding to an object outside the vehicle, thereby forming a light distribution pattern that does not give a glare to, for example, an oncoming vehicle. In a two-wheeled vehicle, a driver moves the center of gravity when turning right or left, and the vehicle travels at a corner while tilting a vehicle body toward a turn direction to increase a bank angle, and thus a light distribution pattern formed by a head lamp is also tilted from a horizontal direction in accordance with the bank angle. In the light distribution pattern tilted from the horizontal direction, when a system similar to a system of a four-wheeled vehicle is adopted so as not to give a glare to an object such as an oncoming vehicle, a non-irradiation range may have to be enlarged to a range that is originally not necessary to be irradiated with light.

In the light distribution pattern tilted relative to the horizontal direction, a light source is turned off in a case where there is an object such as an oncoming vehicle although light radiation to a region below a reference line does not give a glare to the object (Patent Literature 1). This unnecessary turning-off may give a sense of discomfort to a driver of a motorcycle.

Accordingly, an object of the present invention is to provide a vehicle lamp capable of reducing, as much as possible, a non-irradiation range in which light is not radiated to an object in a light distribution pattern formed in a state in which a vehicle body is tilted.

Another object of the present invention is to provide a vehicle lamp for forming a light distribution pattern that does not give a sense of discomfort to a driver of a motorcycle.

Solution to Problem

In order to achieve the above object, a vehicle lamp according to one aspect of the present invention is a vehicle lamp provided in a vehicle that travels at a corner by tilting a vehicle body toward a turn direction.

The vehicle lamp includes
a light source,
an optical member configured to form a predetermined light distribution pattern by radiating light from the light source to a front side of the lamp, and
a controller configured to adjust the predetermined light distribution pattern so as to include a first non-irradiation range in which an object outside the vehicle is not irradiated with the light when the object is detected.
The controller defines the first non-irradiation range based on a case where the vehicle body is in a straight traveling state.
When the vehicle body is in a cornering state,
the controller is configured to
acquire height information of the object in accordance with a tilting state of the vehicle body,
define a second non-irradiation range narrower than the first non-irradiation range based on the height information, and
adjust the predetermined light distribution pattern so as to include the second non-irradiation range instead of the first non-irradiation range.

In order to achieve the above object, a vehicle lamp according to another aspect of the present invention is a vehicle lamp provided in a vehicle that travels at a corner by tilting a vehicle body toward a turn direction.
The vehicle lamp includes
a light source,
an optical member configured to form a predetermined light distribution pattern by radiating light from the light source to a front side of the lamp,
an internal sensor configured to detect tilting of the vehicle body,
an external sensor configured to detect an object, and
a controller configured to control at least one of the light source and the optical member so as to adjust the light distribution pattern.
The light distribution pattern includes a plurality of ranges.
When the internal sensor detects that the tilting of the vehicle body is equal to or larger than a predetermined angle, the light distribution pattern includes a first region below a predetermined reference line and a second region above the reference line.
The reference line is a line that extends in a left-right direction of the vehicle body and is parallel to a horizontal line. The reference line has a predetermined height from the horizontal line.
When one of the plurality of ranges includes only the first region, the controller adjusts the light distribution pattern so as to continue light radiation to the one range regardless of a detection result of the external sensor.

Advantageous Effects of Invention

According to the present invention, it is possible to provide a vehicle lamp capable of reducing, as much as possible, a non-irradiation range in which light is not radiated to an object in a light distribution pattern formed in a state in which a vehicle body is tilted.

According to the present invention, it is possible to provide a vehicle lamp for forming a light distribution pattern that does not give a sense of discomfort to a driver of a motorcycle.

DESCRIPTION OF EMBODIMENTS

An embodiment of the present invention will be described with reference to the drawings. In the present embodiment, a "left-right direction", a "front-rear direction", and an "upper-lower direction" are relative directions set for a vehicle 100 shown in FIG. 1 for the convenience of description.

First Embodiment

Figure 1:
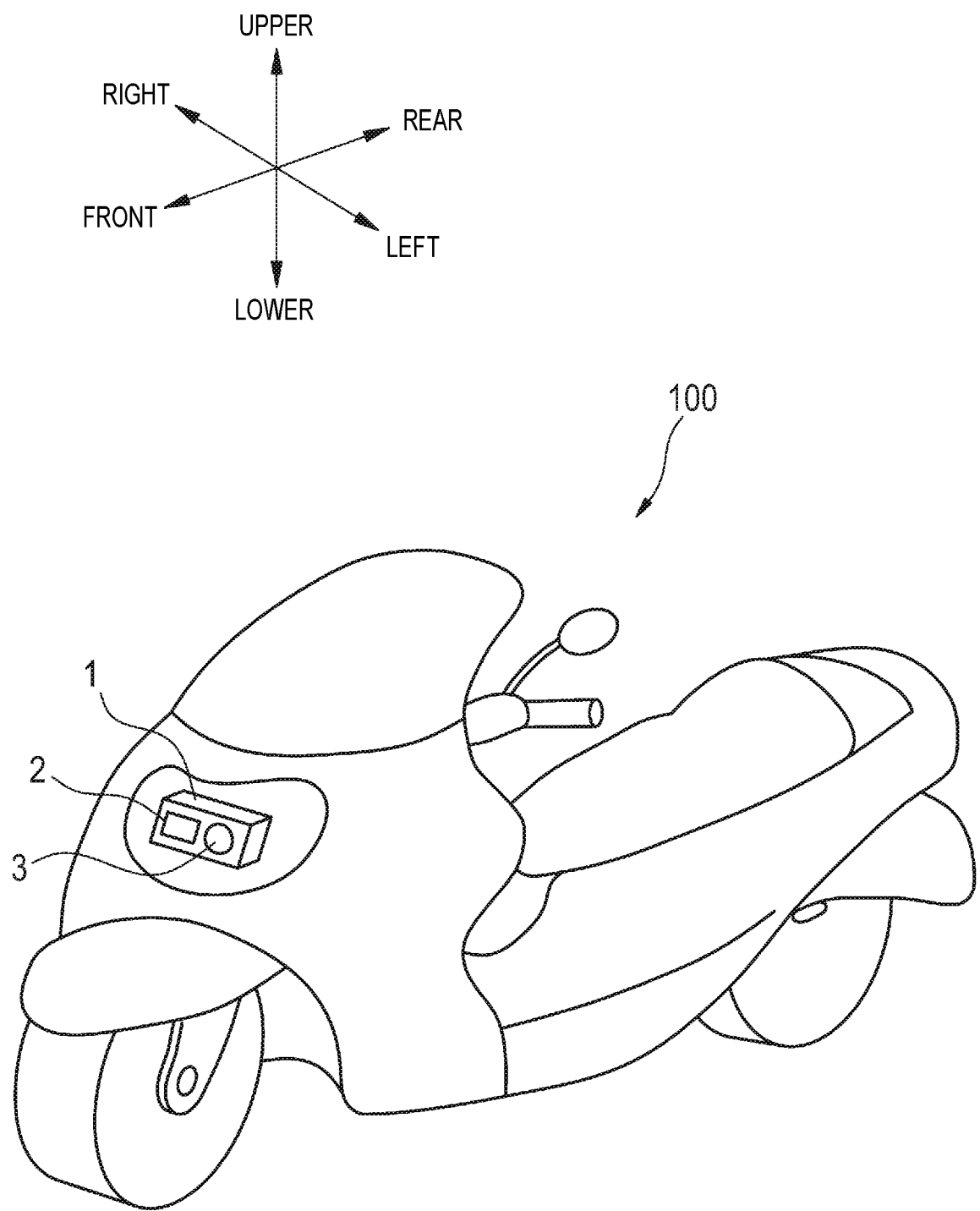
FIG. 1 is a perspective view showing a vehicle including a head lamp (a vehicle lamp) according to a first embodiment of the present invention.

FIG. 1 shows a motorcycle 100 serving as an example of a vehicle according to the first embodiment. The motorcycle 100 is a vehicle capable of traveling along a corner (curve) of a road by tilting a vehicle body toward a turn direction. The number of wheels of the vehicle according to the present embodiment is not limited as long as the vehicle is a vehicle that can travel at a corner by tilting a vehicle body toward a turn direction, such as the motorcycle 100. Therefore, for example, a three-wheeled vehicle, a four-wheeled vehicle, or the like are also included in the vehicle according to the present embodiment as long as the vehicle can travel in the same manner as the motorcycle 100.

As shown in FIG. 1, a head lamp 1 (an example of a vehicle lamp) according to the present embodiment is mounted on a front portion of the motorcycle 100. The head lamp 1 is a lamp that can illuminate a front side of the vehicle, and includes a low beam lamp unit 2 and a high beam lamp unit 3. Although an example in which the motorcycle 100 includes one head lamp 1 is described in the present embodiment, the motorcycle may include, for example, one head lamp at a right side and one head lamp at a left side.

Figure 2:
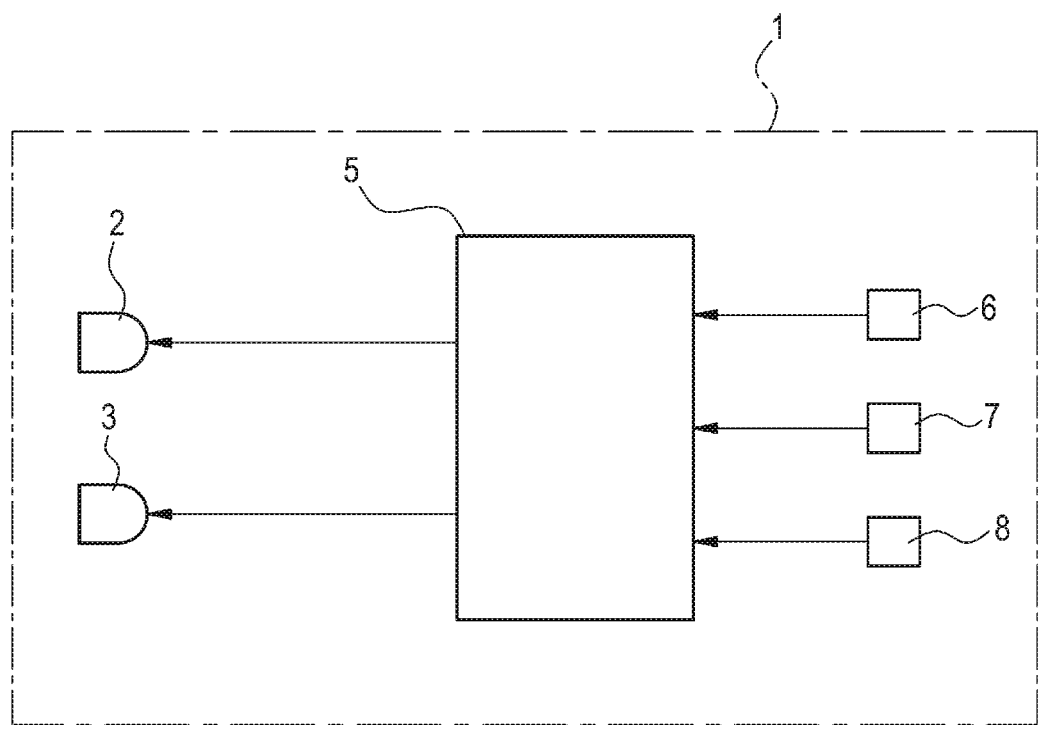
FIG. 2 is a block diagram showing the head lamp shown in FIG. 1.

As shown in FIG. 2, the head lamp 1 includes a lamp controller 5 (an example of a controller) that controls operations of the low beam lamp unit 2 and the high beam lamp unit 3. The low beam lamp unit 2 and the high beam lamp unit 3 are connected to the lamp controller 5. A bank angle sensor 6 (an example of an internal sensor) that detects a tilting state of the motorcycle 100, an external sensor 7 that detects environmental information about the outside of the vehicle, a speed sensor 8 that detects a speed of the motorcycle 100, and the like are electrically connected to the lamp controller 5.

The bank angle sensor 6 is a sensor capable of detecting a tilting angle when the vehicle body of the motorcycle 100 is tilted to the left and right relative to a vertical line. The bank angle sensor 6 is implemented by, for example, a gyro sensor. The tilting angle of the vehicle body may be calculated based on, for example, an image captured by a camera mounted on the vehicle body.

The external sensor 7 is a sensor capable of acquiring information about the outside of the host vehicle including a surrounding environment of the motorcycle 100 (for example, information about the outside of the host vehicle including an obstacle, another vehicle (a preceding vehicle, an oncoming vehicle), a pedestrian, a road shape, a traffic sign, and the like). The external sensor 7 includes, for example, at least one of Light Detection and Ranging or Laser Imaging Detection and Ranging (LiDAR), a camera, a radar, and the like.

Information detected by the bank angle sensor 6, the external sensor 7, and the speed sensor 8 is transmitted to the lamp controller 5. The lamp controller 5 controls the low beam lamp unit 2 and the high beam lamp unit 3 based on the information transmitted from the sensors 6 to 8. For example, the lamp controller 5 can control the head lamp 1 (the low beam lamp unit 2 and the high beam lamp unit 3) based on information detected by each sensor to adjust a light distribution pattern (a low beam light distribution pattern and a high beam light distribution pattern) formed in front of the vehicle.

Figure 3:
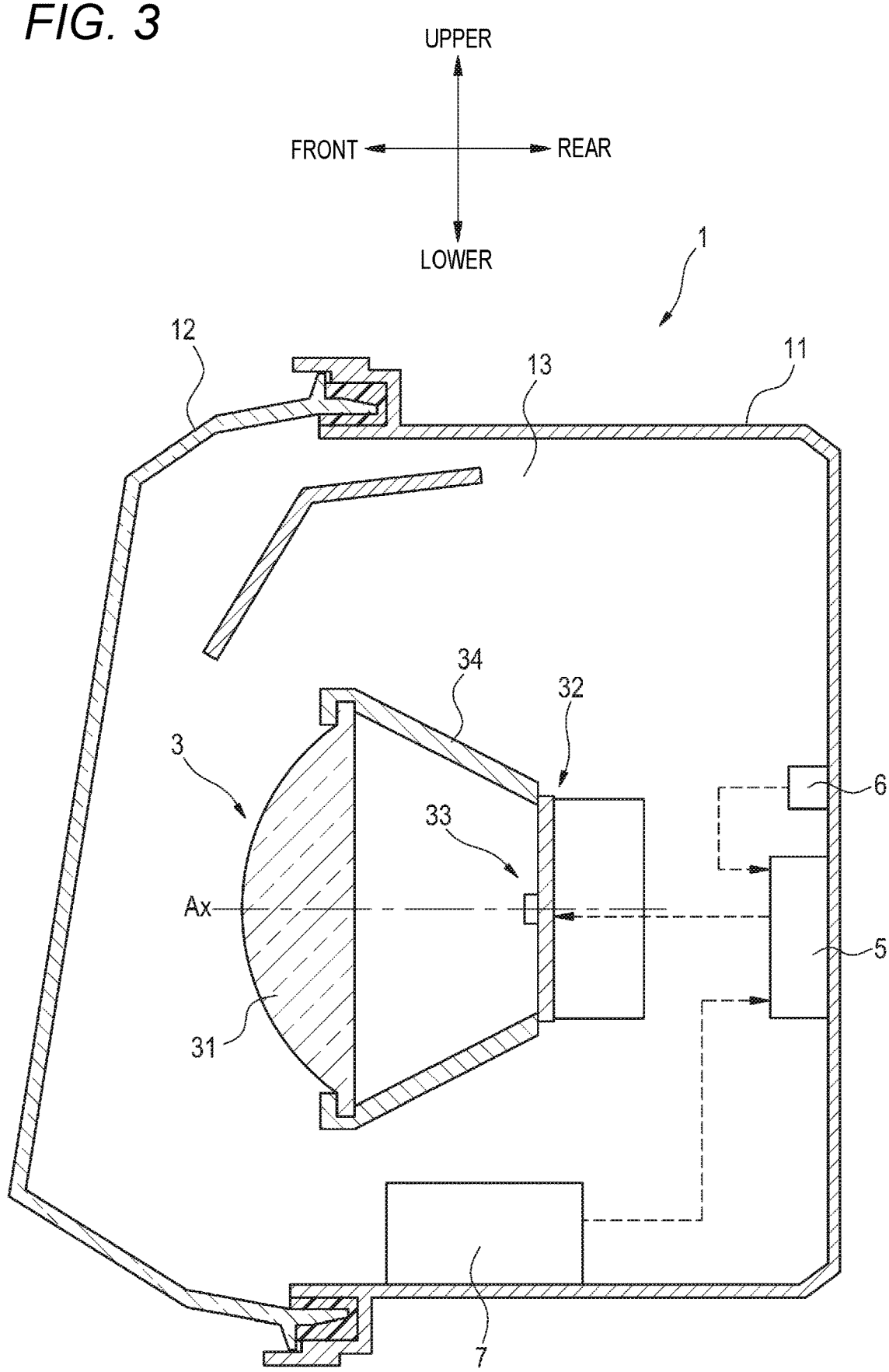
FIG. 3 is a cross-sectional view showing a configuration of a high beam lamp unit provided in the head lamp.

FIG. 3 is a vertical cross-sectional view showing a schematic configuration of the high beam lamp unit 3 provided in the head lamp 1. As shown in FIG. 3, the head lamp 1 includes a lamp body 11 having an opening at a front side of the vehicle, and a transparent front cover 12 attached in a manner of covering the opening of the lamp body 11. The high beam lamp unit 3, the lamp controller 5, the bank angle sensor 6, the external sensor (for example, the LiDAR) 7, and the like are housed in a lamp chamber 13 formed by the lamp body 11 and the front cover 12. Although not shown in the cross-sectional view of FIG. 3, the low beam lamp unit 2 is also housed in the lamp chamber 13 of the head lamp 1 in a similar manner to the high beam lamp unit 3.

The high beam lamp unit 3 is a so-called projector-type lamp. The high beam lamp unit 3 includes a projection lens 31 (an example of an optical member), a light source unit 32 provided with a high beam light source 33 (an example of a light source), and a holder 34 that holds the projection lens 31 and the light source unit 32. The projection lens 31 is a plano-convex aspherical lens having a convex front surface and a flat rear surface, and is disposed on an optical axis Ax extending in the vehicle front-rear direction. A peripheral edge portion of the projection lens 31 is held at a front end side of the holder 34. The projection lens 31 radiates light from the light source 33 to a front side of the lamp to form a predetermined high beam light distribution pattern.

The light source unit 32 is disposed such that the light source 33 faces forward in a direction of the optical axis Ax, and is held at a rear end side of the holder 34. The light source 33 is electrically connected to the lamp controller 5. The holder 34 is attached to the lamp body 11 via a support member (not shown).

Figure 4:
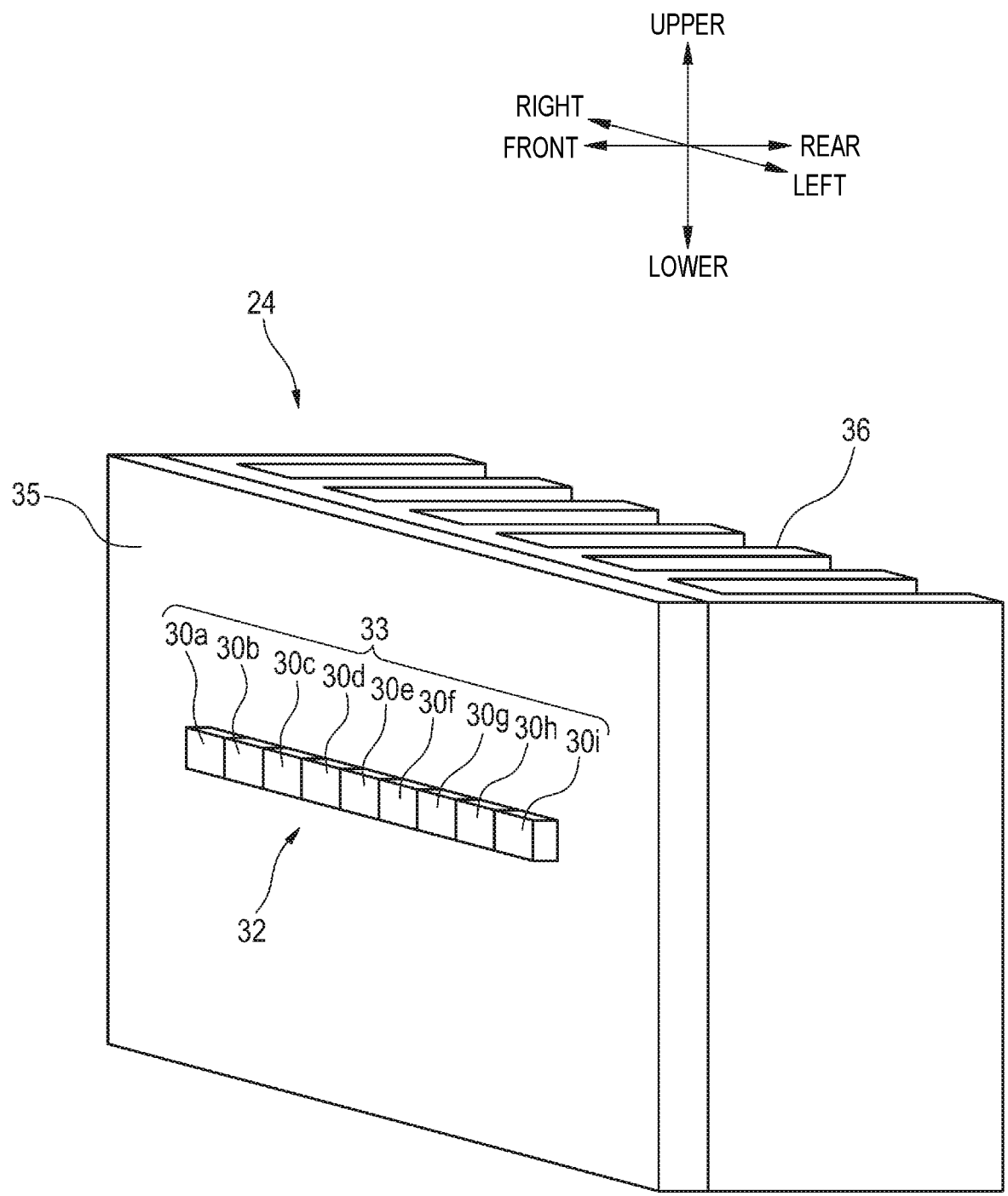
FIG. 4 is a perspective view showing a configuration of a light source unit provided in the high beam lamp unit shown in FIG. 3.

FIG. 4 is a perspective view showing a schematic structure of the light source unit 32 of the high beam lamp unit 3. The light source unit 32 includes the light source 33, a support plate 35, and a heat sink 36. The light source 33 includes a plurality of individual light sources 30 each provided with a light emitting element such as a light emitting diode (LED). The light source 33 includes, for example, individual light sources 30a to 30i that are arranged in parallel in nine horizontal columns and one vertical row, and is fixed to a surface of the support plate 35 at a front side. The individual light sources 30a to 30i are implemented as LED arrays. The individual light sources 30a to 30i are electrically connected to the lamp controller 5. The individual light sources 30a to 30i are controlled to emit light independently of one another by the lamp controller 5 in an adaptive driving beam (ADB) mode to be described later. The individual light sources 30a to 30i are arranged in parallel in the left-right direction (a direction orthogonal to the optical axis Ax). The number and arrangement of the individual light sources 30 are not particularly limited.

The heat sink 36 is a member for dissipating heat generated from the light source 33, and is held on a surface of the support plate 35 at a vehicle rear side. The light source unit 32 is fixed to the holder 34 via the support plate 35.

Figure 5:
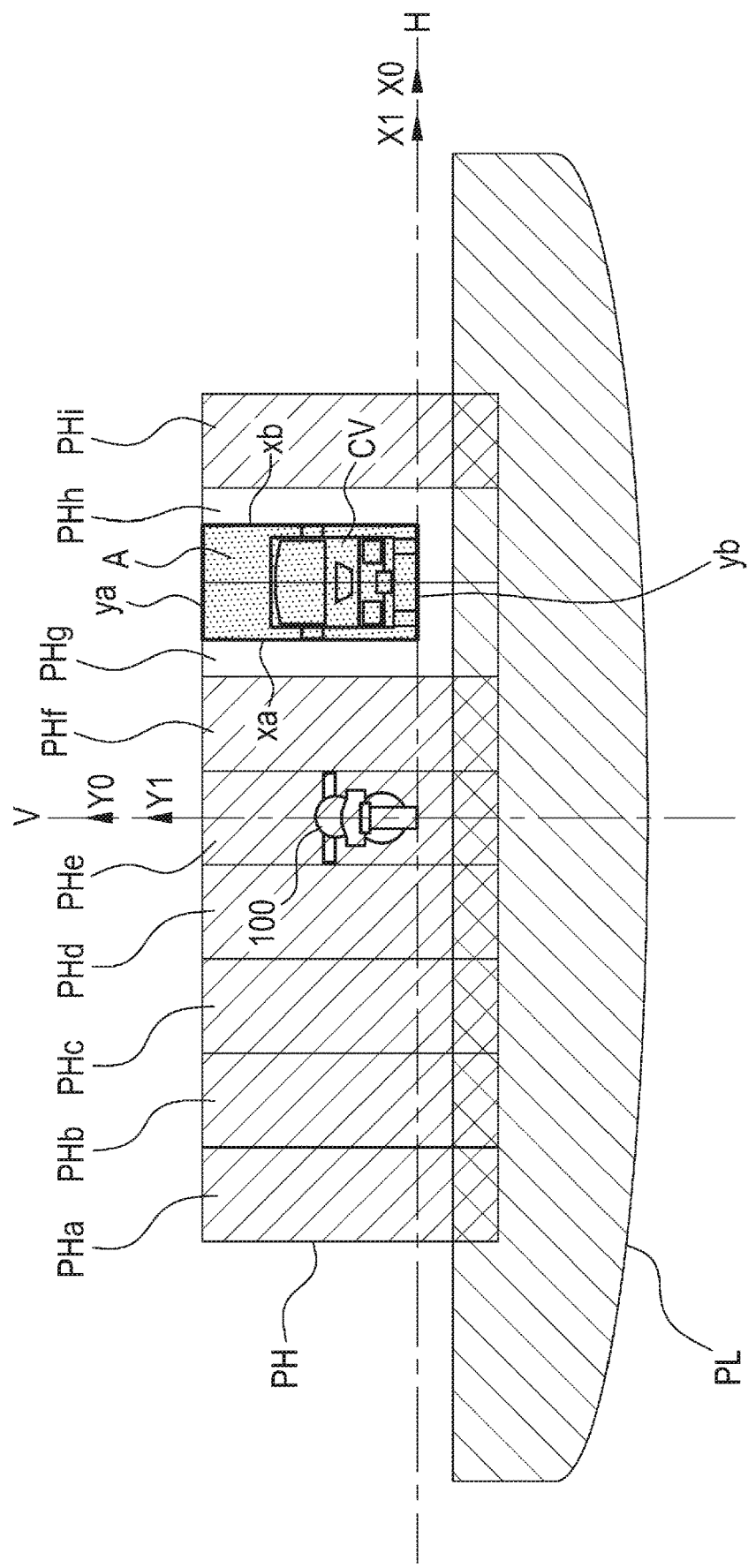
FIG. 5 is a diagram showing a high beam light distribution pattern formed by the high beam lamp unit.
Figure 6:
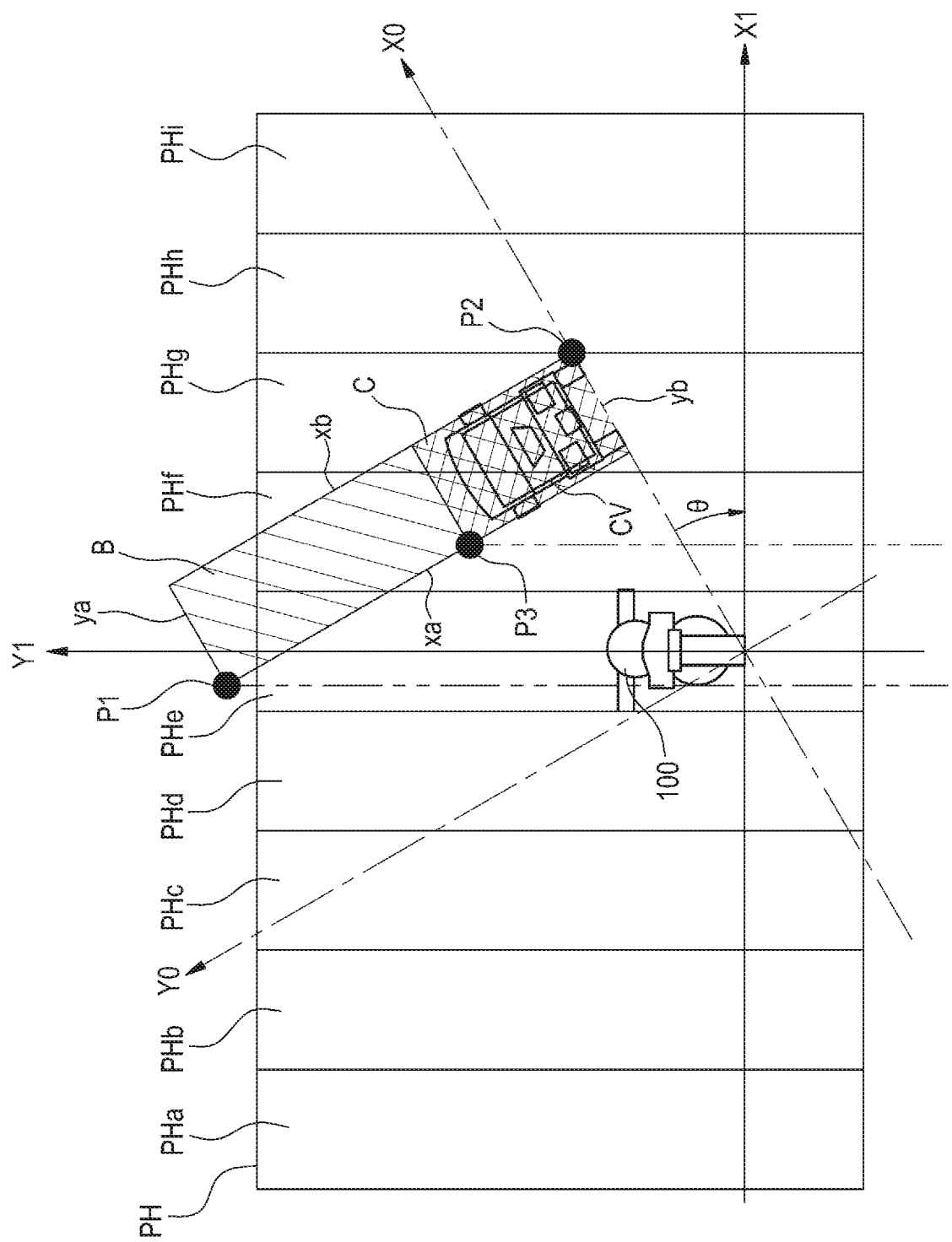
FIG. 6 is a diagram showing the high beam light distribution pattern.

Next, a light distribution pattern according to the first embodiment formed by the head lamp 1 mounted on the motorcycle 100 will be described with reference to FIGS. 5 and 6. FIG. 5 shows a light distribution pattern (a high beam light distribution pattern PH and a low beam light distribution pattern PL) formed in front of the lamp when the vehicle body of the motorcycle 100 is in a straight traveling state, that is, when the motorcycle 100 is traveling in a state in which the vehicle body is perpendicular to a road surface. The case where the vehicle body of the motorcycle 100 is in a straight traveling state includes, for example, a case where the tilting of the vehicle body is within ±10 degrees relative to the case where the vehicle body is perpendicular. FIG. 6 shows a light distribution pattern (in the present example, only the high beam light distribution pattern PH is shown) formed in front of the lamp when the vehicle body of the motorcycle 100 is in a cornering state, for example, when the motorcycle 100 is traveling in a state in which the vehicle body is tilted to the right relative to a road surface in order to travel at a right corner. The high beam light distribution pattern PH is a light distribution pattern formed by the high beam lamp unit 3. The low beam light distribution pattern PL is a light distribution pattern formed by the low beam lamp unit 2.

FIGS. 5 and 6 show a light distribution pattern formed on a virtual vertical screen disposed at a predetermined position in front of the lamp, for example, at a position 25 m in front of the lamp. The motorcycle 100 and an oncoming vehicle CV are displayed in respective coordinate systems. The oncoming vehicle CV is displayed in a road coordinate system X0-Y0. The motorcycle 100 is displayed in a two-wheeled vehicle coordinate system X1-Y1. In the case of FIG. 5 in which the motorcycle 100 is traveling in a straight traveling state, the road coordinate system X0-Y0 and the two-wheeled vehicle coordinate system X1-Y1 are displayed in a manner of coinciding with each other. Here, H-H represent a horizontal direction, and V-V represent a vertical direction.

As shown in FIGS. 5 and 6, the high beam light distribution pattern PH is a light distribution pattern in which partial patterns PHa to PHi are arranged along the horizontal direction. The partial patterns PHa to PHi are respectively formed by the individual light sources 30a to 30i. The partial pattern PHa is a pattern formed by the individual light source 30a. Similarly, the partial pattern PHb is formed by the individual light source 30b, the partial pattern PHc is formed by the individual light source 30c, the partial pattern PHd is formed by the individual light source 30d, the partial pattern PHe is formed by the individual light source 30e, the partial pattern PHf is formed by the individual light source 30f, the partial pattern PHg is formed by the individual light source 30g, the partial pattern PHh is formed by the individual light source 30h, and the partial pattern PHi is formed by the individual light source 30i. The high beam light distribution pattern PH is formed by a combination of formation and non-formation of the partial patterns PHa to PHi in the ADB mode as a high beam light distribution pattern having a different form depending on a situation of the host vehicle, an oncoming vehicle, or a preceding vehicle.

Next, the ADB mode executed by the lamp controller 5 will be described. For example, the lamp controller 5 detects a situation of an oncoming vehicle including the presence or absence of the oncoming vehicle and a position of the oncoming vehicle (a distance from the motorcycle 100 to the oncoming vehicle, position coordinates of the oncoming vehicle on the virtual vertical screen, and the like) based on the environmental information acquired by the external sensor 7. The lamp controller 5 detects a situation of the host vehicle based on, for example, tilting angle information of the vehicle body acquired by the bank angle sensor 6. The lamp controller 5 detects a situation of the host vehicle including traveling and stopping of the host vehicle based on, for example, speed information acquired by the speed sensor 8. The lamp controller 5 individually controls turning on and off of the individual light sources 30 based on information acquired by the external sensor 7, the bank angle sensor 6, and the speed sensor 8. Among the individual light sources 30, the lamp controller 5 turns on the individual light source 30 corresponding to a region in which an object such as an oncoming vehicle is not present, and turns off the individual light source 30 corresponding to a region in which an object such as an oncoming vehicle is present.

For example, in FIG. 5, the lamp controller 5 calculates a direction in which the oncoming vehicle CV is present (positions of left and right sides of the oncoming vehicle CV), a distance from the motorcycle 100 to the oncoming vehicle CV, and the like, based on the information acquired by the external sensor 7 and the speed sensor 8. The lamp controller 5 calculates a traveling tilting angle of the host vehicle based on the information acquired by the bank angle sensor 6. The lamp controller 5 defines a normal light shielding range A (an example of a first non-irradiation range) as a light shielding range for preventing the oncoming vehicle CV from being irradiated with light, based on the information acquired by the external sensor 7, the bank angle sensor 6, and the like. The normal light shielding range A is defined as a range in an X0 axis direction between a boundary line xa that passes through a left side portion of the oncoming vehicle CV and extends in a Y0 axis direction and a boundary line xb that passes through a right side portion of the oncoming vehicle CV and extends in the Y0 axis direction in the road coordinate system X0-Y0. The normal light shielding range A is defined as a range in the Y0 axis direction between a boundary ya that passes through a point at which the boundary lines xa and xb intersect an upper boundary of the high beam light distribution pattern PH in the two-wheeled vehicle coordinate system X1-Y1 and extends in the X0 axis direction and a boundary yb that passes through a point at which the boundary lines xa and xb intersect an X1 axis of the two-wheeled vehicle coordinate system X1-Y1 and extends in the X0 axis direction. The normal light shielding range A may be defined as a range slightly larger than the oncoming vehicle CV or a range slightly smaller than the oncoming vehicle CV.

In the case of the example of FIG. 5 in which the road coordinate system X0-Y0 and the two-wheeled vehicle coordinate system X1-Y1 coincide with each other, a coordinate value of each point in the normal light shielding range A in the road coordinate system X0-Y0 is associated with the same coordinate value in the high beam light distribution pattern PH in the two-wheeled vehicle coordinate system X1-Y1. The lamp controller 5 determines the partial patterns PHa to PHf and PHi corresponding to a region in which the oncoming vehicle CV is not present in the high beam light distribution pattern PH in the two-wheeled vehicle coordinate system X1-Y1 as an irradiation region based on the defined normal light shielding range A. The lamp controller 5 turns on the individual light sources 30a to 30f and 30i corresponding to the irradiation region (the partial patterns PHa to PHf and PHi). On the other hand, the lamp controller 5 determines the partial patterns PHg and PHh corresponding to a region in which the oncoming vehicle CV is present in the high beam light distribution pattern PH in the two-wheeled vehicle coordinate system X1-Y1 as a non-irradiation region (a light shielding region) based on the defined normal light shielding range A. The lamp controller 5 turns off the individual light sources 30g and 30h corresponding to the non-irradiation region (the partial patterns PHg and PHh).

Accordingly, when the motorcycle 100 is traveling in a straight traveling state, the high beam light distribution pattern PH in which the partial patterns PHg and PHh corresponding to the region in which the oncoming vehicle CV is present are set as the non-irradiation region is formed to include the normal light shielding range A so as not to irradiate the oncoming vehicle CV with light. The "non-irradiation region" may include a region in which light is radiated at a low illuminance to an extent that does not give a glare to a driver of the oncoming vehicle.

Next, as shown in FIG. 6, when the motorcycle 100 is in a cornering state, for example, when the vehicle body is tilted to the right by an angle θ relative to the road surface, the two-wheeled vehicle coordinate system X1-Y1 are tilted by the angle θ relative to the road coordinate system X0-Y0. In FIG. 6, the two-wheeled vehicle coordinate system X1-Y1 is displayed along the horizontal direction and the vertical direction of the paper surface.

In the example shown in FIG. 6, the lamp controller 5 defines a normal light shielding range B (an example of a first non-irradiation range) surrounded by the boundary lines xa, xb, ya, and yb in the road coordinate system X0-Y0 based on information of the oncoming vehicle CV acquired by the external sensor 7, the bank angle sensor 6, and the like, in a similar manner to the case described in FIG. 5 (the case where the vehicle body is in the straight traveling state).

For example, the lamp controller 5 converts coordinates for a coordinate value of an upper left point P1 which is an intersection point between the boundary line xa and the boundary line ya in the normal light shielding range B and a coordinate value of a lower right point P2 which is an intersection point between the boundary line xb and the boundary line yb, based on information such as the tilting angle θ of the vehicle body, and calculates the coordinate values as coordinate values in the two-wheeled vehicle coordinate system X1-Y1. At this time, a coordinate value (x01, y01) of the upper left point P1 in the normal light shielding range B in the road coordinate system X0-Y0 is calculated as, for example, a coordinate value (x11, y11) in the two-wheeled vehicle coordinate system X1-Y1. A coordinate value (x02, y02) of the upper left point P2 in the normal light shielding range B in the road coordinate system X0-Y0 is calculated as, for example, a coordinate value (x12, y12) in the two-wheeled vehicle coordinate system X1-Y1. The coordinate values of the upper left point P1 and the lower right point P2 in the two-wheeled vehicle coordinate system X1-Y1 are values that change in accordance with the tilting angle of the vehicle body.

The lamp controller 5 specifies the partial pattern PHe of the high beam light distribution pattern PH including the coordinate value x11 in a region in the X0 axis direction as a region corresponding to the coordinate value (x11, y11) in the two-wheeled vehicle coordinate system X1-Y1. The lamp controller 5 specifies the partial pattern PHh of the high beam light distribution pattern PH including the coordinate value x12 in a region in the X0 axis direction as a region corresponding to the coordinate value (x12, y12) in the two-wheeled vehicle coordinate system X1-Y1. The lamp controller 5 determines the partial patterns PHe, PHf, PHg, and PHh extending from the specified partial pattern PHe to the specified partial pattern PHh as a non-irradiation region. The lamp controller 5 turns off the individual light sources 30e, 30f, 30g, and 30h corresponding to the non-irradiation region (the partial patterns PHe, PHf, PHg, and PHh). On the other hand, the lamp controller 5 determines the partial patterns PHa to PHd and PHi other than the partial patterns PHe, PHf, PHg, and PHh as an irradiation region. The lamp controller 5 turns on the individual light sources 30a to 30d and 30i corresponding to the irradiation region (the partial patterns PHa to PHd and PHi).

In this manner, when the non-irradiation region of the high beam light distribution pattern PH is set with reference to the upper left point P1 and the lower right point P2 in the normal light shielding range B defined when the vehicle body is tilted, for example, a range of the non-irradiation region is larger than the non-irradiation region set when the vehicle body is in the straight traveling state described with reference to FIG. 5. Specifically, the non-irradiation region corresponding to the normal light shielding range A set when the vehicle body is in the straight traveling state described with reference to FIG. 5 are the two partial patterns PHg and PHh, while the non-irradiation region corresponding to the normal light shielding range B set when the vehicle body is in the cornering state are the four partial patterns PHe, PHf, PHg, and PHh.

On the other hand, in the head lamp 1 according to the present embodiment, the lamp controller 5 selects a left measurement point P3 which is a point below the upper left point P1 on the boundary line xa, instead of the upper left point P1 which is the intersection point between the boundary line xa and the boundary line ya in the normal light shielding range B. The left measurement point P3 is a point selected based on a size of the oncoming vehicle CV, for example, a vehicle height of the oncoming vehicle CV. For example, a coordinate value of the left measurement point P3 in the Y0 axis direction is set in advance to be a maximum vehicle height value in consideration of a vehicle height of a large vehicle that is assumed as an oncoming vehicle. For example, 3 m is set as the maximum vehicle height value. For example, the left measurement point P3 may be set in consideration of a line-of-sight position of a driver of an oncoming vehicle. The lamp controller 5 defines a reduced light shielding range C (an example of a second non-irradiation range) as a light shielding range for preventing the oncoming vehicle CV from being irradiated with light in the road coordinate system X0-Y0 based on the selected left measurement point P3. The reduced light shielding range C is a light shielding range defined as a region narrower than the normal light shielding range B.

The lamp controller 5 converts coordinates of a coordinate value of the selected left measurement point P3 based on information such as the tilting angle θ of the vehicle body, and calculates the coordinate value as a coordinate value in the two-wheeled vehicle coordinate system X1-Y1. At this time, a coordinate value (x03, y03) of the left measurement point P3 in the normal light shielding range B in the road coordinate system X0-Y0 is calculated as, for example, a coordinate value (x13, y13) in the two-wheeled vehicle coordinate system X1-Y1.

The lamp controller 5 specifies the partial pattern PHf of the high beam light distribution pattern PH including the coordinate value x13 in a region in the X0 axis direction as a region corresponding to the coordinate value (x13, y13) in the two-wheeled vehicle coordinate system X1-Y1. The lamp controller 5 specifies the partial pattern PHh of the high beam light distribution pattern PH as a region corresponding to the coordinate value (x12, y12) in the two-wheeled vehicle coordinate system X1-Y1 at the lower right point P2 in the same manner as described above. The lamp controller 5 determines the partial patterns PHf, PHg, and PHh extending from the specified partial pattern PHf to the specified partial pattern PHh as a non-irradiation region. The lamp controller 5 turns off the individual light sources 30f, 30g, and 30h corresponding to the non-irradiation region (the partial patterns PHf, PHg, and PHh). On the other hand, the lamp controller 5 determines the partial patterns PHa to PHe and PHi other than the partial patterns PHf, PHg and PHh as an irradiation region. The lamp controller 5 turns on the individual light sources 30a to 30e and 30i corresponding to the irradiation region (the partial patterns PHa to PHe and PHi).

That is, when the vehicle body is tilted to the right side, when the non-irradiation region of the high beam light distribution pattern PH is set with reference to the left measurement point P3 and the lower right point P2 in the reduced light shielding range C, a range of the non-irradiation region is smaller than the non-irradiation region set with reference to the upper left point P1 and the lower right point P2 in the normal light shielding range B. Specifically, the non-irradiation region withe reference to the upper left point P1 and the lower right point P2 in the normal light shielding range B are the four partial patterns PHe, PHf, PHg, and PHh, while the non-irradiation region with reference to the left measurement point P3 and the lower right point P2 in the reduced light shielding range C are the three partial patterns PHf, PHg, and PHh.

As the tilting of the vehicle body relative to the road surface increases, the tilting angle θ of the two-wheeled vehicle coordinate system X1-Y1 relative to the road coordinate system X0-Y0 also increases. Therefore, when the coordinate value (x01, y01) of the upper left point P1 in the normal light shielding range B in the road coordinate system X0-Y0 is converted and calculated as the coordinate value (x11, y11) in the two-wheeled vehicle coordinate system X1-Y1, a difference between the coordinate values (x01, y01) and (x11, y11) increases as the tilting of the vehicle body increases. When the difference between the coordinate values (x01, y01) and (x11, y11) increases, a position of a partial pattern of the high beam light distribution pattern PH that is specified as a region corresponding to the coordinate value (x11, y11) changes to the left direction, and a range of the partial pattern determined as the non-irradiation region increases. Therefore, it is possible to reduce the difference between the coordinate values (x03, y03) and (x13, y13) when the coordinate value (x03, y03) of the left measurement point P3 is converted and calculated as the coordinate value (x13, y13) in the two-wheel vehicle coordinate system X1-Y1 and it is possible to reduce a range of the partial pattern determined to be the non-irradiation region, by specifying the coordinate value (x03, y03) of the left measurement point P3 based on the maximum vehicle height value of the oncoming vehicle CV and defining the reduced light shielding range C narrower than the normal light shielding range B.

Although a case where the motorcycle 100 tilts the vehicle body to the right relative to the road surface has been described in the present embodiment, for example, when the motorcycle 100 tilts the vehicle body to the left relative to the road surface, the lamp controller 5 can also set the non-irradiation region of the high beam light distribution pattern PH in the same manner. Specifically, when the vehicle body is tilted to the left, a coordinate value of a right measurement point can be specified based on the maximum vehicle height value of the oncoming vehicle CV, and the reduced light shielding range narrower than the normal light shielding range can be defined.

As described above, the head lamp 1 according to the present embodiment includes the light source 33, the projection lens 31 that radiates the light from the light source 33 toward the front side of the lamp to form the predetermined high beam light distribution pattern PH, and the lamp controller 5 that adjusts the predetermined high beam light distribution pattern PH so as to include the normal light shielding range B (an example of the first non-irradiation range) in which the oncoming vehicle CV (an example of an object) outside the vehicle is not irradiated with light when the oncoming vehicle CV is detected. The lamp controller 5 is configured to define the normal light shielding range B based on a case where the vehicle body is in a straight traveling state, acquire height information of an object according to a tilting state of the vehicle body when the vehicle body is in a cornering state, define the reduced light shielding range C (an example of a second non-irradiation range) narrower than the normal light shielding range B based on the height information, and adjust the predetermined high beam light distribution pattern PH so as to include the reduced light shielding range C instead of the normal light shielding range B. As a result, in the high beam light distribution pattern PH formed in a state in which the vehicle body of the motorcycle 100 is tilted, the non-irradiation range for preventing light from being radiated to a region where the oncoming vehicle CV is present can be reduced to be as small as possible.

In the present embodiment, the light source 33 includes a plurality of individual light sources 30a to 30i arranged in parallel, and the high beam light distribution pattern PH includes a plurality of partial patterns PHa to PHi formed in parallel along the horizontal direction by light from the plurality of individual light sources 30a to 30i. Among the partial patterns PHa to PHi, the lamp controller 5 turns off the individual light source 30 that forms a partial pattern including the reduced light shielding range C based on the height information of the oncoming vehicle CV, thereby forming the predetermined high beam light distribution pattern PH including the reduced light shielding range C. In this manner, the reduced light shielding range C can be formed with a simple configuration using an LED array or the like.

(Modification)

Next, a modification of a control method in which the lamp controller 5 defines the reduced light shielding range C will be described with reference to FIGS. 7A and 7B. In the embodiment described above, the lamp controller 5 selects the left measurement point P3 based on the maximum vehicle height value (for example, 3 m) that is assumed to be a vehicle height of the oncoming vehicle CV, and defines the reduced light shielding range C. However, the present invention is not limited thereto. For example, the lamp controller 5 may acquire a vehicle height value of each oncoming vehicle CV measured by the external sensor 7, select the left measurement point P3 relative to each oncoming vehicle CV based on the acquired vehicle height value, and define the reduced light shielding range C for each oncoming vehicle CV.

Figure 7A:
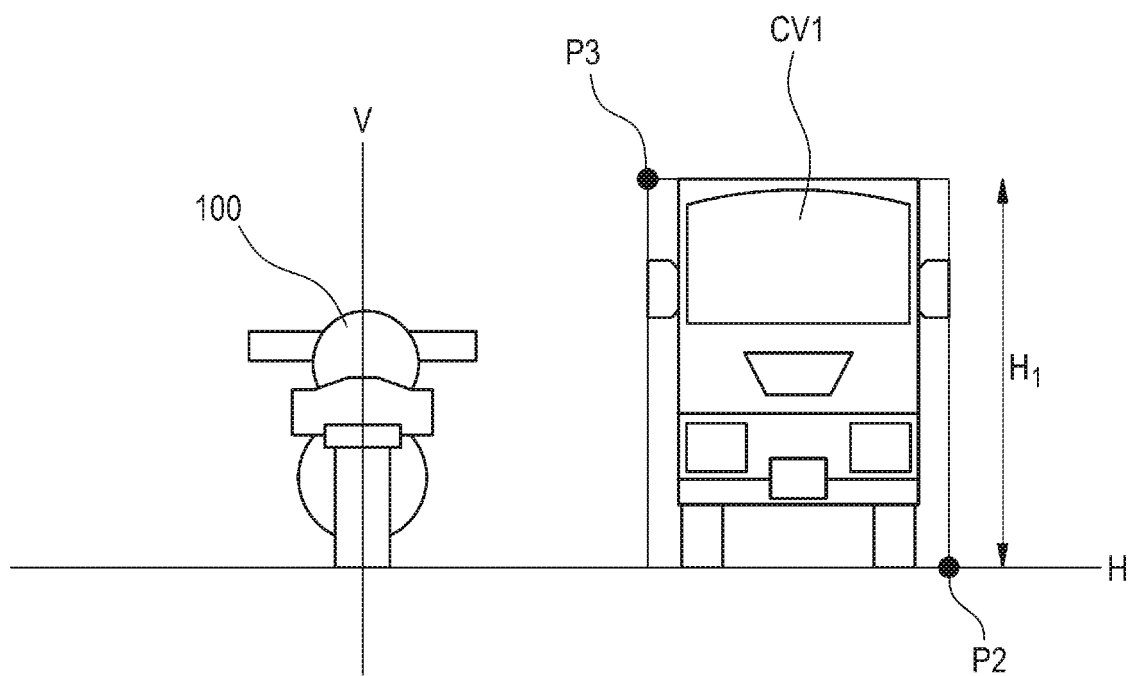
FIG. 7A is a diagram showing a modification of a control method for defining a minimum light shielding range.

For example, as shown in FIG. 7A, when an oncoming vehicle CV1 is a large vehicle and a vehicle height value H1 of the oncoming vehicle CV1 is acquired, the lamp controller 5 selects the left measurement point P3 relative to the oncoming vehicle CV1 based on the acquired vehicle height value H1, and defines the reduced light shielding range C of the oncoming vehicle CV1.

Figure 7B:
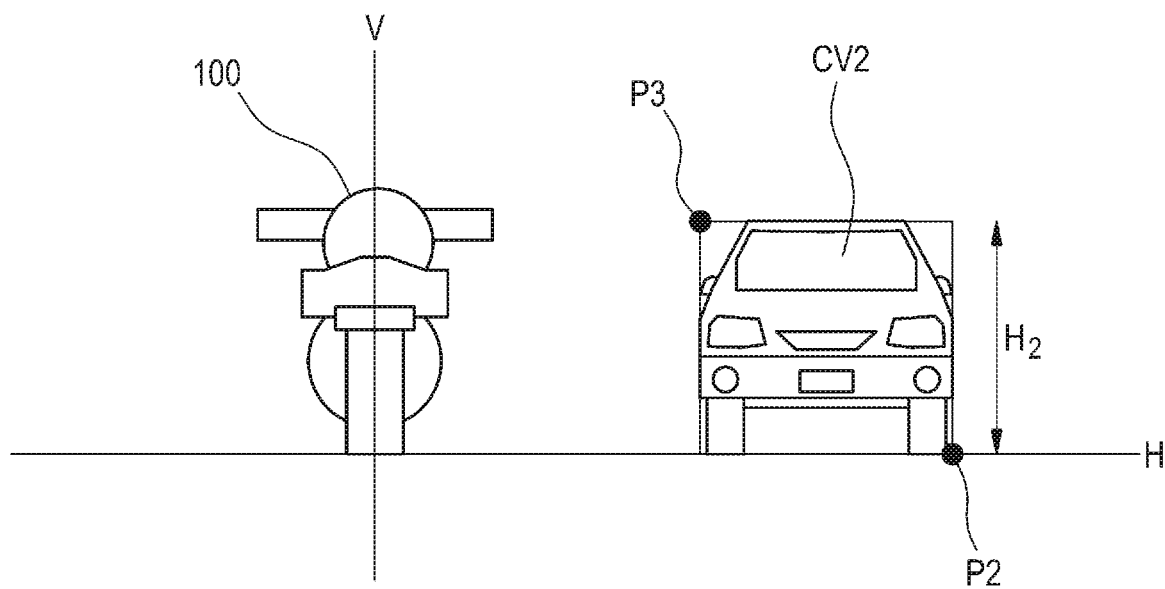
FIG. 7B is a diagram showing a modification of the control method for defining the minimum light shielding range.

For example, as shown in FIG. 7B, when an oncoming vehicle CV2 is a small vehicle and a vehicle height value H2 of the oncoming vehicle CV2 smaller than the vehicle height value H1 of the oncoming vehicle CV1 is acquired, the lamp controller 5 selects the left measurement point P3 relative to the oncoming vehicle CV2 based on the acquired vehicle height value H2, and defines the reduced light shielding range C of the oncoming vehicle CV2. As a result, when the oncoming vehicle CV is a small vehicle, a small reduced light shielding range C can be defined.

As described above, according to the control method for the lamp controller 5 in the present modification, the reduced light shielding range C (the second non-irradiation range) is changed in accordance with the height of the oncoming vehicle CV, so that the reduced light shielding range C can be further narrowed. An object to be shielded from light is not limited to the oncoming vehicle CV, and the same control may be executed on a preceding vehicle.

Second Embodiment

Next, a configuration of a high beam lamp unit 103 provided in a head lamp 101 according to the second embodiment will be described with reference to FIGS. 8 and 9.

Figure 8:
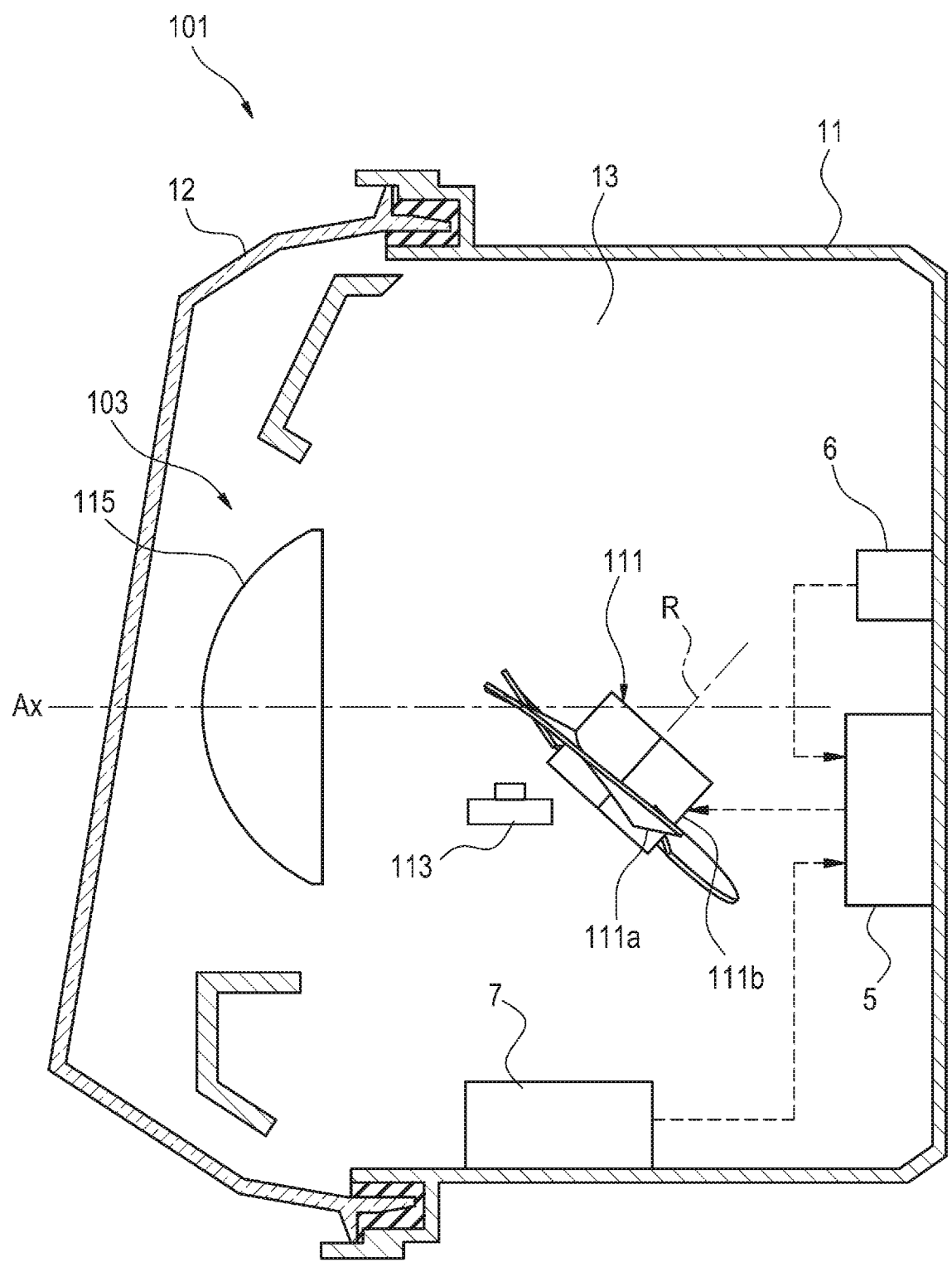
FIG. 8 is a cross-sectional view showing a configuration of a high beam lamp unit provided in a head lamp according to a second embodiment.

As shown in FIG. 8, the high beam lamp unit 103 is a projector-type lamp. The high beam lamp unit 103 includes a rotation reflector 111 (an example of an optical member), an LED 113 (an example of a light source), and a projection lens 115 (an example of an optical member) disposed in front of the rotation reflector 111. Instead of the LED 113, a semiconductor light emitting element such as an EL element or an LD element may be used as the light source. In particular, a light source capable of being accurately turned on and off in a short time is preferably used in a control for not radiating a part of a light distribution pattern to be described later. A shape of the projection lens 115 may be appropriately selected according to required light distribution characteristics such as a light distribution pattern and an illuminance distribution, and an aspherical lens or a free-form surface lens is used. In the present embodiment, a convex aspherical lens is used as the projection lens 115.

The rotation reflector 111 is rotated in one direction about a rotation axis R by a driving source such as a motor (not shown). The rotation reflector 111 includes a reflecting surface configured to reflect light emitted from the LED 113 while being rotated to form a desired light distribution pattern.

Figure 9:
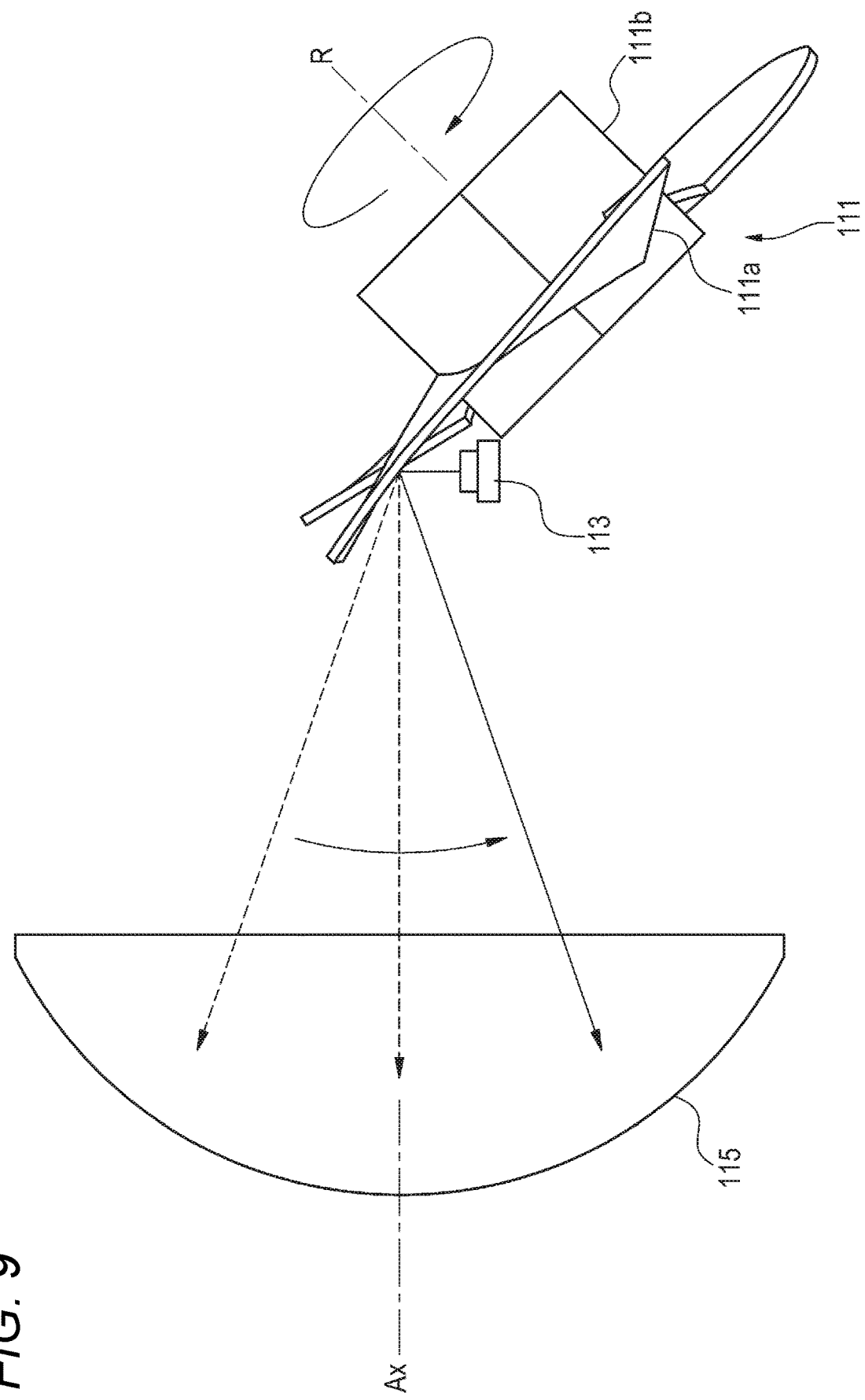
FIG. 9 is a perspective view showing a configuration of an optical member provided in the high beam lamp unit shown in FIG. 8.

As shown in FIG. 9, the rotation reflector 111 includes three blades 111a having the same shape and a cylindrical rotation portion 111b. The blades 111a function as reflecting surfaces and are provided around the rotation portion 111b. The rotation axis R of the rotation reflector 111 is tilted relative to the optical axis Ax, and is provided in a plane including the optical axis Ax and the LED 113.

The blade 111a has a twisted shape such that an angle formed by the optical axis Ax and the reflecting surface changes toward a circumferential direction around the rotation axis R. As a result, it is possible to perform scanning using the light of the LED 113 as shown in FIG. 9. Specifically, the rotation reflector 111 can scan a front side once in one direction (the horizontal direction) using the light of the LED 113 by rotating the rotation reflector 111 by 120 degrees. That is, when one blade 111a passes a front side of the LED 113, a desired region in front of the vehicle is scanned once with the light of the LED 113.

In the second embodiment, the lamp controller 5 defines the normal light shielding range B based on a case where the vehicle body is in a straight traveling state, acquires height information of an object according to a tilting state of the vehicle body when the vehicle body is in a cornering state, defines the reduced light shielding range C (a second non-irradiation range) narrower than the normal light shielding range B based on the height information, and adjusts the predetermined high beam light distribution pattern PH so as to include the reduced light shielding range C instead of the normal light shielding range B. Specifically, based on the information of the tilting angle θ of the vehicle body, the lamp controller 5 converts coordinates for the coordinate value of the left measurement point P3 selected based on the height information of the oncoming vehicle CV, and calculates the coordinate value as a coordinate value in the two-wheeled vehicle coordinate system X1-Y1. Next, the lamp controller 5 specifies a partial pattern of a part of the high beam light distribution pattern PH as a region corresponding to the coordinate value calculated as the coordinate value in the two-wheeled vehicle coordinate system X1-Y1, and determines the specified partial pattern as a non-irradiation region. Next, the lamp controller 5 synchronizes the timing of turning on and off the LED 113 with the rotation of the rotation reflector 111, thereby controlling operations of the LED 113 and the rotation reflector 111 so that the non-irradiation region of the high beam light distribution pattern PH is not irradiated with the light from the LED 113. As described above, similar to the high beam lamp unit 3 according to the first embodiment including the LED array, a non-irradiation range for preventing light from radiating to a region in which the oncoming vehicle CV is present can be reduced as much as possible by defining the reduced light shielding range C instead of the normal light shielding range B based on the height information of the oncoming vehicle CV when the vehicle body is tilted in the high beam lamp unit 103 of a scanning optical system including the rotation reflector 111.

Instead of the rotation reflector 111, a high beam lamp unit of a scanning optical system including a galvanometer mirror or a polygon mirror may be employed. In this case, the same effects as those of the first embodiment and the second embodiment can be achieved by performing the same control as described above.

Third Embodiment

Next, a light distribution pattern according to the third embodiment formed by the head lamp 1 mounted on the motorcycle 100 will be described with reference to FIG. 10.

Figure 10:
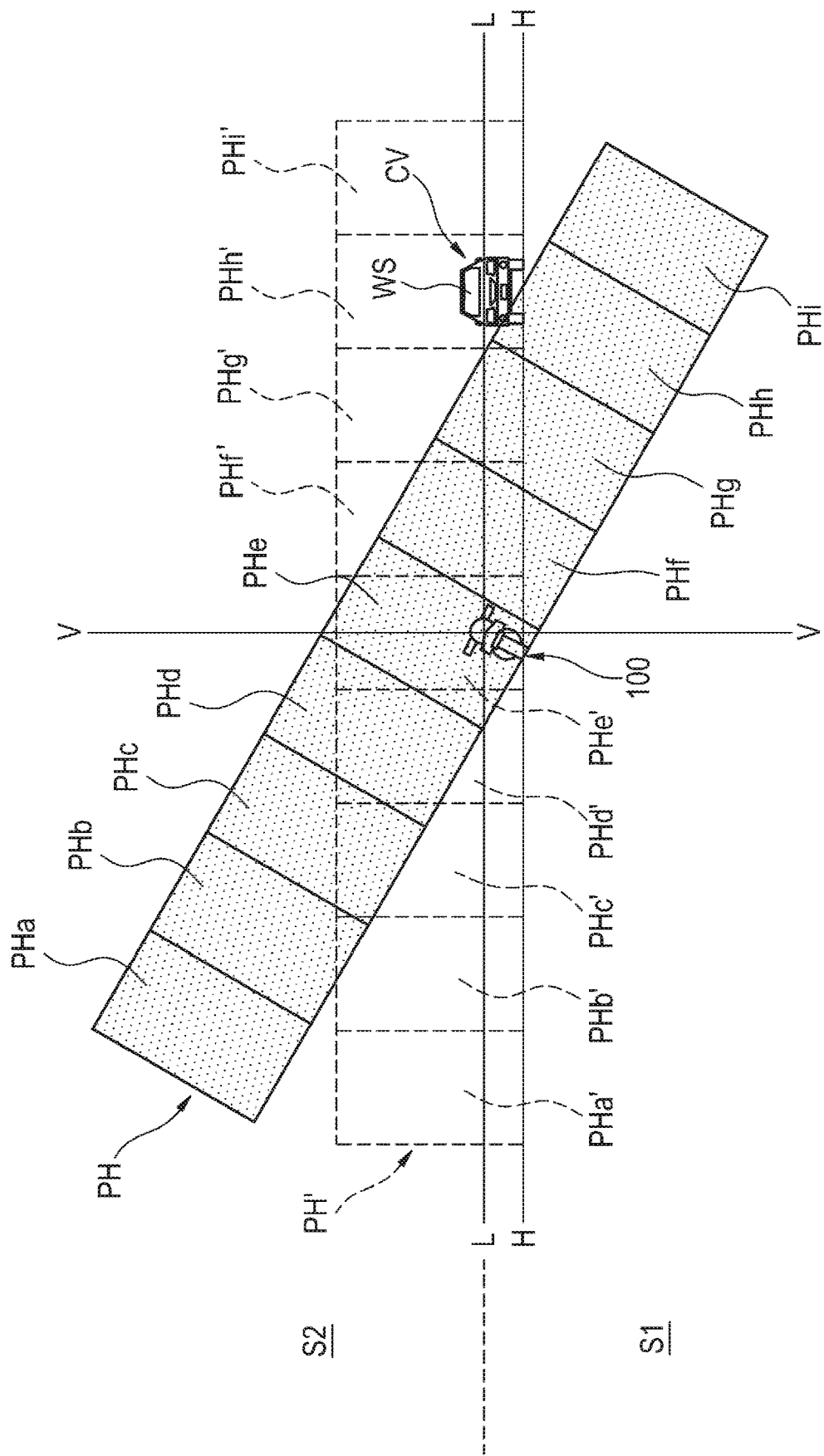
FIG. 10 is a diagram showing an example of a light distribution pattern in a case where a vehicle travels in a state in which the vehicle is tilted relative to a road surface.

FIG. 10 shows a light distribution pattern formed on a virtual vertical screen disposed at a predetermined position in front of the lamp, for example, at a position 25 m in front of the lamp. In FIG. 10, H-H indicates the horizontal direction (a horizontal line H), and V-V indicate the vertical direction. FIG. 10 shows the oncoming vehicle CV which is an example of an object. The object may include a preceding vehicle.

In FIG. 10, the high beam light distribution pattern PH is a light distribution pattern formed by the high beam lamp unit 3, and is an example of a light distribution pattern. Although not shown in FIG. 10, the low beam light distribution pattern PL is a light distribution pattern formed by the low beam lamp unit 2.

FIG. 10 shows a light distribution pattern in a case where the motorcycle 100 forms a light distribution pattern and travels in a state where the vehicle body is tilted relative to the road surface. For example, FIG. 10 shows a light distribution pattern in a case where the motorcycle 100 moves to the right side of the road surface or travels on a curved road that curves to the right. A bank angle of the vehicle body is not limited, and the bank angle is, for example, 10 degrees, 20 degrees, 30 degrees, or the like. A method for controlling a light distribution pattern when the motorcycle 100 moves to the left side of the road surface or travels on a curved road that curves to the left is the same as a method for controlling a light distribution pattern when the motorcycle 100 moves to the right side of the road surface or travels on a curved road that curves to the right, except that the left and right directions are reversed, and thus description thereof will be omitted.

The light emitted from the high beam lamp unit 3 is emitted toward the front side of the vehicle to form the high beam light distribution pattern PH. Specifically, of the high beam lamp unit 3, the individual light source 30a forms the partial pattern PHa, the individual light source 30b forms the partial pattern PHb, the individual light source 30c forms the partial pattern PHc, the individual light source 30d forms the partial pattern PHd, the individual light source 30e forms the partial pattern PHe, the individual light source 30f forms the partial pattern PHf, the individual light source 30g forms the partial pattern PHg, the individual light source 30h forms the partial pattern PHh, and the individual light source 30i forms the partial pattern PHi, and the high beam light distribution pattern PH is formed by combining the partial patterns PHa to PHi. In other words, the high beam light distribution pattern PH includes a plurality of partial patterns PHa to PHi (examples of a range). In the present embodiment, since the high beam lamp unit 3 includes a total of nine individual light sources 30a to 30i as shown in FIG. 4, nine partial patterns PHa to PHi are formed as shown in FIG. 10. The high beam lamp unit 3 forms a plurality of high beam light distribution patterns PH having different shapes in accordance with the oncoming vehicle CV by a combination of formation and non-formation of the partial patterns PHa to PHi in the ADB mode to be described later.

A case where the motorcycle 100 changes from a state in which the motorcycle 100 travels with the vehicle body being perpendicular to the road surface while forming the high beam light distribution pattern PH to a state in which the motorcycle 100 travels with the vehicle body being tilted relative to the road surface will be described below. When the motorcycle 100 travels with the vehicle body being tilted relative to the road surface, the high beam lamp unit 3 is also tilted relative to the road surface in accordance with the tilting of the vehicle body, and thus the high beam light distribution pattern PH is formed to be tilted relative to the horizontal direction H-H. In FIG. 10, a high beam light distribution pattern PH' in a case where the motorcycle 100 travels in a state where the vehicle body is perpendicular to the road surface is indicated by a broken line, and the high beam light distribution pattern PH in a case where the motorcycle 100 travels in a state where the vehicle body is tilted relative to the road surface is indicated by a solid line.

When the lamp controller 5 determines that a bank angle (tilting) of the vehicle body detected by the bank angle sensor 6 is equal to or larger than a predetermined angle, the lamp controller 5 identifies the high beam light distribution pattern PH as a first region S1 that is a region below a predetermined reference line L, and identifies the high beam light distribution pattern PH as a second region S2 serving as a region above the reference line L. The reference line L is a line extending in the left-right direction of the vehicle body and parallel to the horizontal line H, and has a predetermined height from the horizontal line H at a position of an object.

Next, the ADB mode executed by the lamp controller 5 will be described. For example, the lamp controller 5 detects a situation of the oncoming vehicle CV including the presence or absence of the oncoming vehicle CV and a position of the oncoming vehicle CV (a distance from the motorcycle 100 to the oncoming vehicle, position coordinates of the oncoming vehicle on the virtual vertical screen, and the like) based on the environmental information acquired by the external sensor 7. For example, the lamp controller 5 detects the tilting of the vehicle body based on the tilting angle information of the vehicle body acquired by the bank angle sensor 6. The lamp controller 5 detects a situation of the motorcycle 100 including traveling and stopping of the motorcycle 100 based on, for example, speed information acquired by the speed sensor 8. The lamp controller 5 controls a light distribution pattern based on information acquired by the external sensor 7, the bank angle sensor 6, and the speed sensor 8.

When the lamp controller 5 acquires the environmental information from the external sensor 7, the lamp controller 5 individually controls turning on and off of the plurality of individual light sources 30 of the high beam lamp unit 3 based on a detection result. Specifically, the lamp controller 5 controls each of the plurality of individual light sources 30 of the high beam lamp unit 3 such that, among the plurality of individual light sources 30a to 30i, the individual light source 30 for forming a partial pattern that is used for light radiation of the high beam light distribution pattern PH is turned on and the individual light source 30 for forming a partial pattern that is not used for light radiation of the high beam light distribution pattern PH is turned off.

FIG. 10 shows a state in which the oncoming vehicle CV is present at a position of a partial pattern PHh' when the motorcycle 100 travels in a state in which the vehicle body is tilted relative to the road surface. The partial pattern PHh' is a part of the high beam light distribution pattern PH' when the motorcycle 100 travels in a state in which the vehicle body is perpendicular to the road surface. When the external sensor 7 detects the oncoming vehicle CV, the external sensor 7 transmits the detection result to the lamp controller 5.

The lamp controller 5 that received the detection result from the external sensor 7 turns on or off the individual light sources 30 of the high beam lamp unit 3. In the related art, in order to prevent a light source from giving a glare to a driver of the oncoming vehicle CV, the lamp controller 5 executes a control to turn off an individual light source corresponding to a partial pattern in which the oncoming vehicle CV is present. In the case of FIG. 10, the lamp controller 5 turns off the individual light source 30h so as to turn off the partial pattern PHh corresponding to the partial pattern PHh'. However, since the high beam light distribution pattern PH is formed to be tilted relative to the reference line L in accordance with the tilting of the vehicle body, the oncoming vehicle CV is actually not present in the partial pattern PHh, and it is not necessary to turn off the individual light source 30h. In other words, although the driver of the oncoming vehicle CV is not affected by the glare, the vehicle lamp turns off the corresponding individual light source 30h so as not to radiate light for the partial pattern PHh corresponding to the position of the oncoming vehicle CV in the related art. In this manner, there is a problem that unnecessary turning-off of the individual light sources 30h may give a sense of discomfort to the driver of the motorcycle 100.

The lamp controller 5 according to the present embodiment determines whether each of the partial patterns PHa to PHi includes only the first region S1 that is a region below the reference line L, and avoids unnecessary turning-off of an individual light source. In the case of FIG. 10, since the partial patterns PHh and PHi include only the first region S1, the lamp controller 5 controls the individual light sources 30h and 30i so as to continue to radiate light for the partial patterns PHh and PHi. Even when the oncoming vehicle CV is present at the position of the partial pattern PHh', the lamp controller 5 controls the individual light source 30h to continue to be turned on regardless of the detection result of the external sensor 7. Since the partial pattern PHh includes only the first region S1, it is not necessary to turn off the individual light source 30h. In the present embodiment, since the oncoming vehicle CV is not present in the partial patterns PHa to PHg, the individual light sources 30a to 30g may continue to be turned on. This is because it is less likely to give a glare to the driver of the oncoming vehicle CV even when the individual light sources 30a to 30g are turned on.

In this manner, since light is continued to be radiated to the first region S1 that is a region below the reference line L regardless of the detection result of the external sensor 7 in the present embodiment, unnecessary turning-off of the individual light source 30 is not performed, and it is possible to provide a light distribution pattern which does not give a sense of discomfort to the driver of the motorcycle 100.

Figure 11:
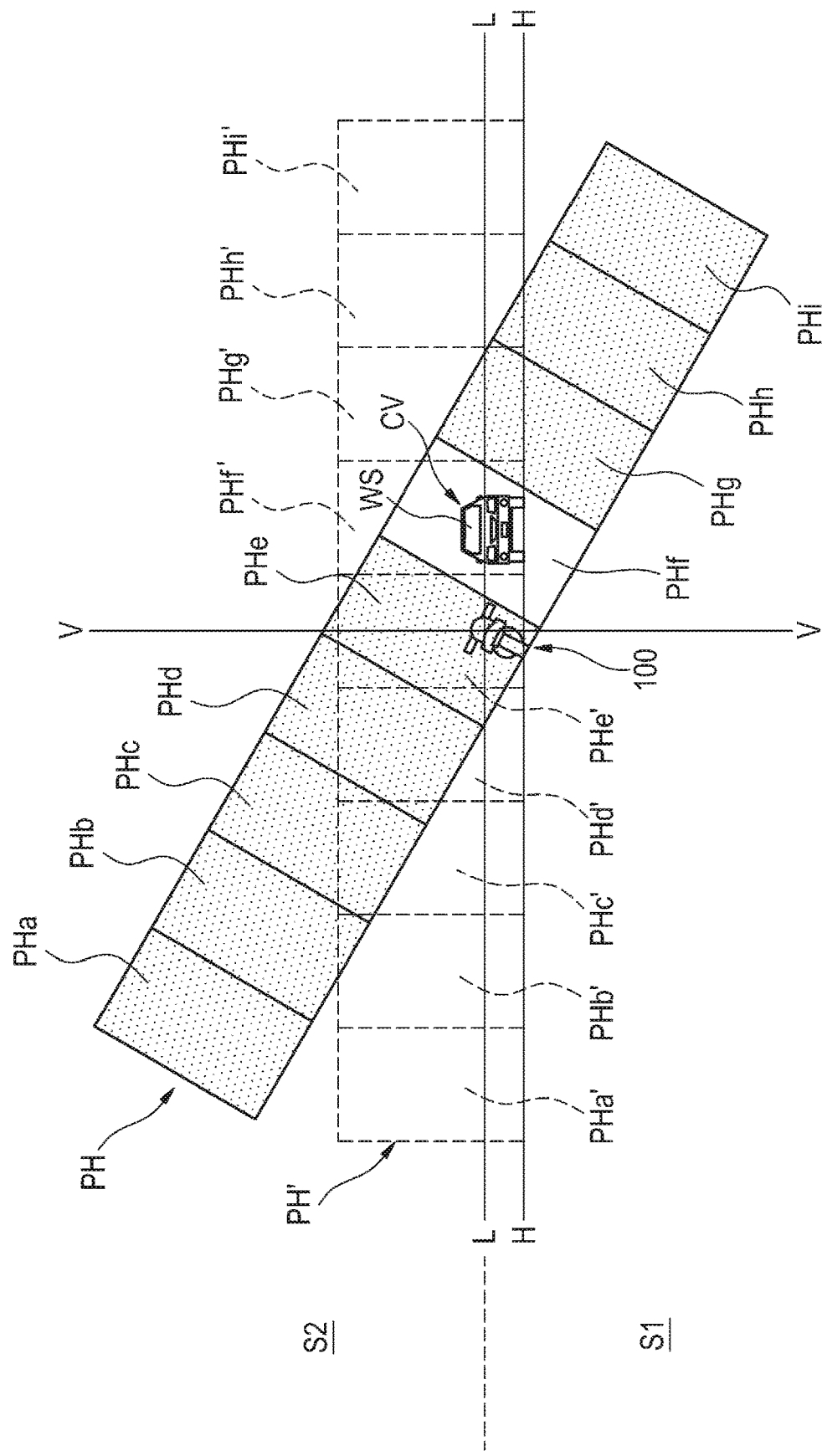
FIG. 11 is a diagram showing another example of a light distribution pattern in a case where a vehicle travels in a state in which the vehicle is tilted relative to a road surface.

When a certain partial pattern includes both the first region S1 and the second region S2 and the external sensor 7 detects that the oncoming vehicle CV is present in the partial pattern, the lamp controller 5 may turn off a corresponding individual light source and adjusts a light distribution pattern so as not to radiate light for the partial pattern. FIG. 11 shows a state in which the oncoming vehicle CV is present at the position of the partial pattern PHf when the motorcycle 100 travels in a state in which the vehicle body is tilted relative to the road surface. The partial pattern PHf includes both the first region S1 and the second region S2, and includes the oncoming vehicle CV. When the external sensor 7 detects that the oncoming vehicle CV is present in the partial pattern PHf, the external sensor 7 transmits the detection result to the lamp controller 5.

The lamp controller 5 that received the detection result from the external sensor 7 turns off the corresponding individual light source 30f so as not to radiate light for the partial pattern PHf. In this manner, it is possible to prevent the motorcycle 100 from giving a glare to the driver of the oncoming vehicle CV while continuing the light radiation to the first region S1 which is a region below the reference line L in the present embodiment.

When an object is one of the oncoming vehicle CV and a preceding vehicle, the reference line L is preferably lower than window glass of the oncoming vehicle CV or window glass of the preceding vehicle. Examples of the window glass include a front window and a rear window of a four-wheeled vehicle, and a front shield of a two-wheeled vehicle. The window glass is not limited to glass, and may be formed of other materials such as resin and vinyl. When an object is the oncoming vehicle CV, the reference line L is preferably lower than a windshield WS or a front window of the oncoming vehicle CV. That is, the lamp controller 5 may adjust the high beam light distribution pattern PH so as to radiate light to a position lower than the windshield WS or the front window of the oncoming vehicle CV regardless of the detection result of the external sensor 7. In this case, it is possible to prevent the motorcycle 100 from giving a glare to the driver of the oncoming vehicle CV and avoid unnecessary turning off of the individual light sources 30, thereby providing a light distribution pattern that does not give a sense of discomfort to the driver of the motorcycle 100 in the present embodiment. When an object is a preceding vehicle, the reference line L is preferably lower than a rear window or a marker lamp of the preceding vehicle.

The reference line L may be lower than a head lamp of an oncoming automobile. That is, the lamp controller 5 may adjust the high beam light distribution pattern PH so as to radiate light to a position lower than a head lamp of the oncoming automobile. In this case, since the reference line L is lower than the head lamp of the oncoming automobile in the present embodiment, light is not radiated to the face of a driver of the oncoming automobile, and it is possible to prevent the motorcycle 100 from giving a glare to the driver of the oncoming automobile.

In the partial pattern PHf that includes both the first region S1 and the second region S2 and in which the oncoming vehicle CV is present, the lamp controller 5 may control the individual light source 30f so as to turn on the individual light source 30f for the first region S1 below the reference line L in the partial pattern PHf and turn off the individual light source 30f for the second region S2 above the reference line L in the partial pattern PHf. That is, the lamp controller 5 controls one individual light source so that a part of one partial pattern is irradiated with light and the other part is not irradiated with light. In this case, it is preferable that the high beam lamp unit includes a scanning optical system including a rotation reflector and the like.

Figure 12:
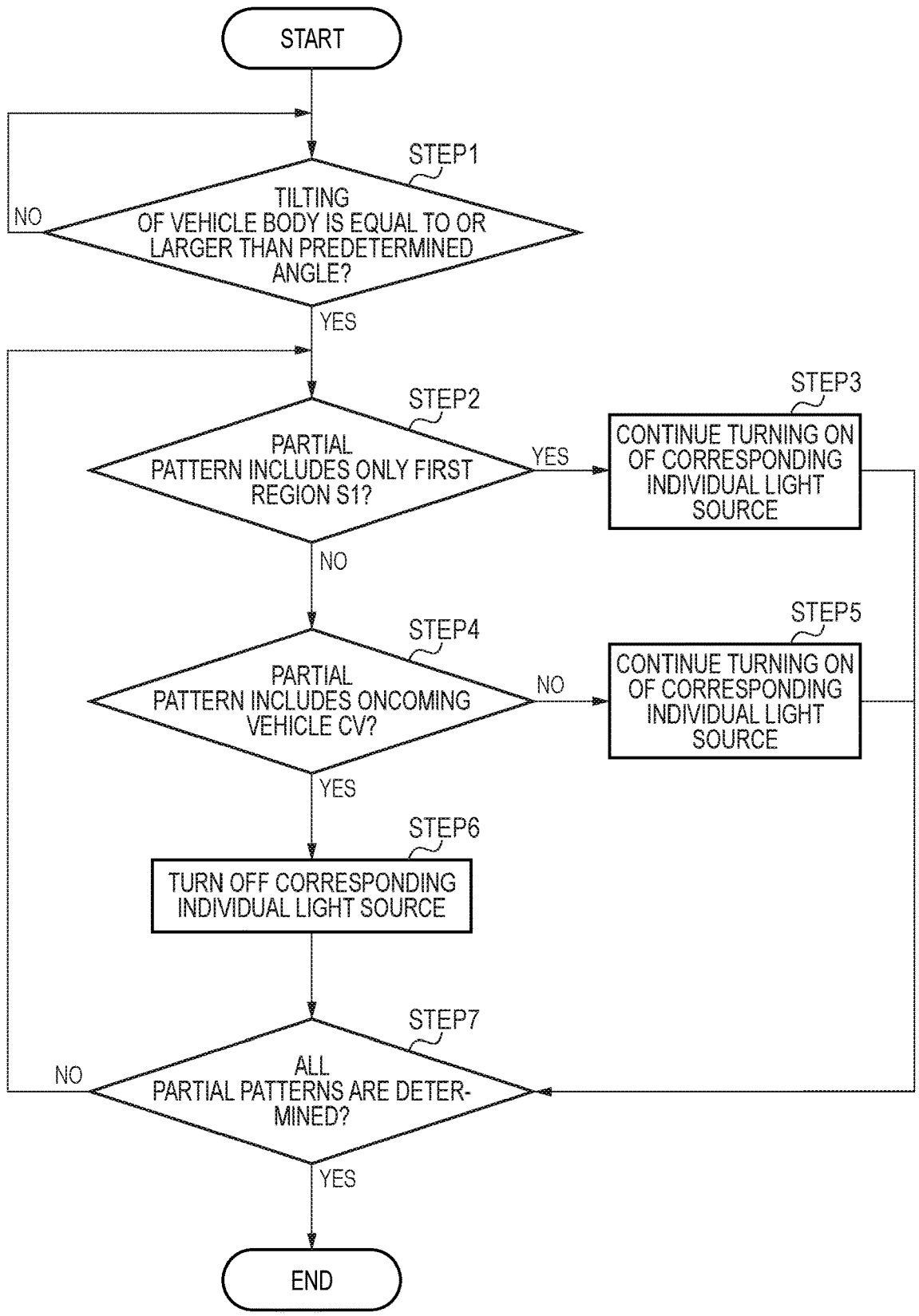
FIG. 12 is a flowchart showing a method for adjusting a light distribution pattern.

FIG. 12 is a flowchart showing a method for adjusting a high beam light distribution pattern. Hereinafter, a method for controlling the high beam light distribution pattern PH by the lamp controller 5 will be described.

First, the lamp controller 5 determines whether the tilting of the vehicle body is equal to or larger than a predetermined angle by using the bank angle sensor 6 (STEP 1). When the tilting of the vehicle body is less than the predetermined angle (NO in STEP 1), the lamp controller 5 returns to STEP 1 and continues the detection periodically until the tilting of the vehicle body is equal to or larger than the predetermined angle.

When the tilting of the vehicle body is equal to or larger than the predetermined angle (YES in STEP 1), the lamp controller 5 determines whether each of the partial patterns PHa to PHi includes only the first region S1 (STEP 2). When it is determined that there is a partial pattern including only the first region S1 among the plurality of partial patterns (YES in STEP 2), the lamp controller 5 continues the turning on of the corresponding individual light source 30 so as to continue light radiation for the partial pattern regardless of the detection result of the external sensor 7 (STEP 3).

In FIG. 10, since the partial patterns PHh and PHi include only the first region S1, the lamp controller 5 continues the turning on of the individual light sources 30h and 30i. Even when the oncoming vehicle CV is present, the lamp controller 5 controls the individual light source 30h so as to continue the turning on of the individual light source 30h regardless of the detection result of the external sensor 7. This is because the partial pattern PHh includes only the first region S1, it is less likely to give a glare to the driver of the oncoming vehicle CV, and it is not necessary to turn off the individual light source 30h. In this manner, unnecessary turning off of the individual light source 30 is not performed, and it is possible to provide a light distribution pattern that does not give a sense of discomfort to the driver of the motorcycle 100 in the present embodiment.

When the lamp controller 5 determines that there is a partial pattern including not only the first region S1 but also the second region S2 among the plurality of partial patterns PHa to PHi (NO in STEP 2), the external sensor 7 detects whether the oncoming vehicle CV is present in the partial pattern (STEP 4).

When the external sensor 7 does not detect the oncoming vehicle CV (NO in STEP 4), the lamp controller 5 continues the turning on of the corresponding individual light source 30 so as to continue the light radiation for the partial pattern (STEP 5).

In FIG. 10, the partial patterns PHe, PHf, and PHg are partial patterns including not only the first region S1 but also the second region S2, and the oncoming vehicle CV is not present in these partial patterns PHe, PHf, and PHg. In this case, the lamp controller 5 controls the individual light sources 30e, 30f, and 30g to continue the turning on of the individual light sources 30e, 30f, and 30g so as to continue light radiation for the partial patterns PHe, PHf, and PHg. In this manner, it is possible to secure a light amount for a partial pattern in which the oncoming vehicle CV is not present, and it is possible to improve the visibility at the time of driving support in the present embodiment.

When the external sensor 7 detects the oncoming vehicle CV (YES in STEP 4), it is determined that the partial pattern is a partial pattern that includes not only the first region S1 but also the second region S2, and is a partial pattern in which the oncoming vehicle CV is present. In this case, the lamp controller 5 turns off the corresponding individual light source 30 so as not to radiate light for the partial pattern (STEP 6).

In FIG. 11, since the partial pattern PHf includes both the first region S1 and the second region S2 and the oncoming vehicle CV is present in the partial pattern PHf, the lamp controller 5 turns off the individual light source 30f In this manner, it is possible to prevent the motorcycle 100 from giving a glare to the driver of the oncoming vehicle CV while continuing the light radiation to the first region S1 which is a region below the reference line L in the present embodiment.

After STEP 3, STEP 5, and STEP 6, the lamp controller 5 checks whether all partial patterns are determined (STEP 7). When not all of the partial patterns are determined (NO in STEP 7), the lamp controller 5 repeats STEP 2 to STEP 7 for a partial pattern that is not determined. When all of the partial patterns PHa to PHi are determined (YES in STEP 7), the high beam light distribution pattern PH is formed, and the processing is ended.

Although embodiments of the present invention have been described above, it is needless to say that the technical scope of the present invention should not be interpreted as being limited to the description of the embodiments. It is to be understood by those skilled in the art that the present embodiment is merely an example and various modifications may be made within the scope of the invention described in the claims. The technical scope of the present invention should be determined based on the scope of the inventions described in the claims and a scope of equivalents thereof.

Although the lamp controller 5, the bank angle sensor 6, and the external sensor 7 are housed in the lamp chamber of the head lamp 1 in the embodiment described above, the present invention is not limited thereto. The lamp controller 5, the bank angle sensor 6, and the external sensor 7 may be disposed separately from the head lamp 1.

The present application is based on Japanese Patent Application NO. 2019-226553 filed on Dec. 16, 2019 and Japanese Patent Application NO. 2019-226554 filed on Dec. 16, 2019.

The invention claimed is:

1. A vehicle lamp provided in a vehicle that travels at a corner by tilting a vehicle body toward a turn direction, the vehicle lamp comprising:
 a light source;
 an optical member configured to form a predetermined light distribution pattern by radiating light from the light source to a front side of the lamp; and
 a controller configured to adjust the predetermined light distribution pattern so as to include a first non-irradiation range in which an object outside the vehicle is not irradiated with the light when the object is detected,
 wherein the controller is configured to define the first non-irradiation range based on a case where the vehicle body is in a straight traveling state, and
 wherein the controller is configured to, based on a determination that when the vehicle body is in a cornering state,
  acquire a coordinate of height information of the object with respect to a road coordinate system, in accordance with a tilting state of the vehicle body,
  define a second non-irradiation range narrower than the first non-irradiation range, based on the coordinate of the height information, and
  adjust the predetermined light distribution pattern so as to include the second non-irradiation range instead of the first non-irradiation range by converting, from the road coordinate system to a vehicle body coordinate system, the coordinate of the height information based on the tilting state of the vehicle body, and by specifying a partial pattern corresponding to the converted coordinate of the height information, the partial pattern being included in the predetermined light distribution pattern.

2. The vehicle lamp according to claim 1,
wherein the light source includes a plurality of light emitting elements arranged in parallel,
wherein the light distribution pattern includes a plurality of regions formed in parallel along a horizontal direction by light from the plurality of light emitting elements, and
wherein the controller is configured to form the predetermined light distribution pattern including the second non-irradiation range by turning off a light emitting element configured to form a region including the second non-irradiation range among the plurality of regions, based on the height information.

3. The vehicle lamp according to claim 1,
wherein the optical member includes at least one of a rotation reflector, a galvanometer mirror, and a polygon mirror, and
wherein the controller is configured to form the predetermined light distribution pattern including the second non-irradiation range by controlling a scanning direction of the light by at least one of the rotation reflector, the galvanometer mirror, and the polygon mirror and an emission timing of the light from the light source, based on the height information.

4. The vehicle lamp according to claim 1,
wherein the object includes at least one of an oncoming vehicle and a preceding vehicle, and
wherein the controller is configured to change the second non-irradiation range based on the height information changed based on a height of at least one of the oncoming vehicle and the preceding vehicle, the height being measured by an external sensor provided in the vehicle.

5. A vehicle lamp provided in a vehicle that travels at a corner by tilting a vehicle body toward a turn direction, the vehicle lamp comprising:

a light source;
an optical member configured to form a predetermined light distribution pattern by radiating light from the light source to a front side of the lamp;
an internal sensor configured to detect tilting of the vehicle body;
an external sensor configured to detect an object; and
a controller configured to control at least one of the light source and the optical member so as to adjust the light distribution pattern,
wherein the light distribution pattern includes a plurality of ranges,
wherein when the internal sensor detects that the tilting of the vehicle body is equal to or larger than a predetermined angle,
  the light distribution pattern includes a first region below a predetermined reference line and a second region above the reference line, and
  the reference line is a line that extends in a left-right direction of the vehicle body and is parallel to a horizontal line, and has a predetermined height from the horizontal line, and
wherein when one of the plurality of ranges includes only the first region, the controller adjusts the light distribution pattern so as to continue light radiation to the one range regardless of a detection result of the external sensor.

6. The vehicle lamp according to claim 5,
wherein when one of the plurality of ranges includes both the first region and the second region and the external sensor detects that the object is included in the one range, the controller adjusts the light distribution pattern so as not to radiate light to the one range.

7. The vehicle lamp according to claim 5,
wherein the object includes at least one of an oncoming vehicle and a preceding vehicle, and
  wherein the reference line is lower than window glass of the oncoming vehicle or window glass of the preceding vehicle.

* * * * *